No. 879,217. PATENTED FEB. 18, 1908.
S. P. THRASHER.
TICKET DELIVERING AND REGISTERING MECHANISM.
APPLICATION FILED SEPT. 17, 1906. RENEWED SEPT. 17, 1907.
2 SHEETS—SHEET 1.
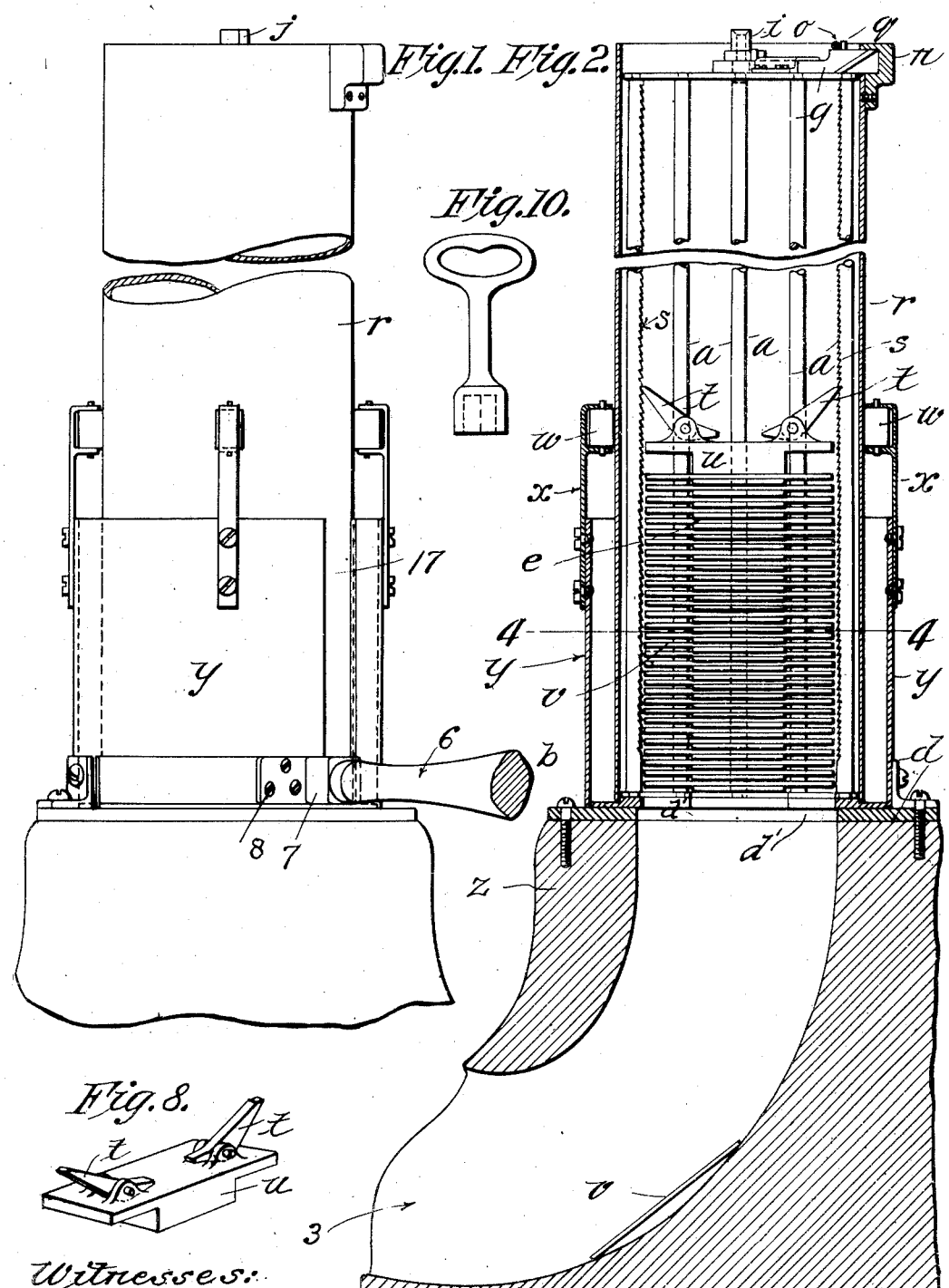

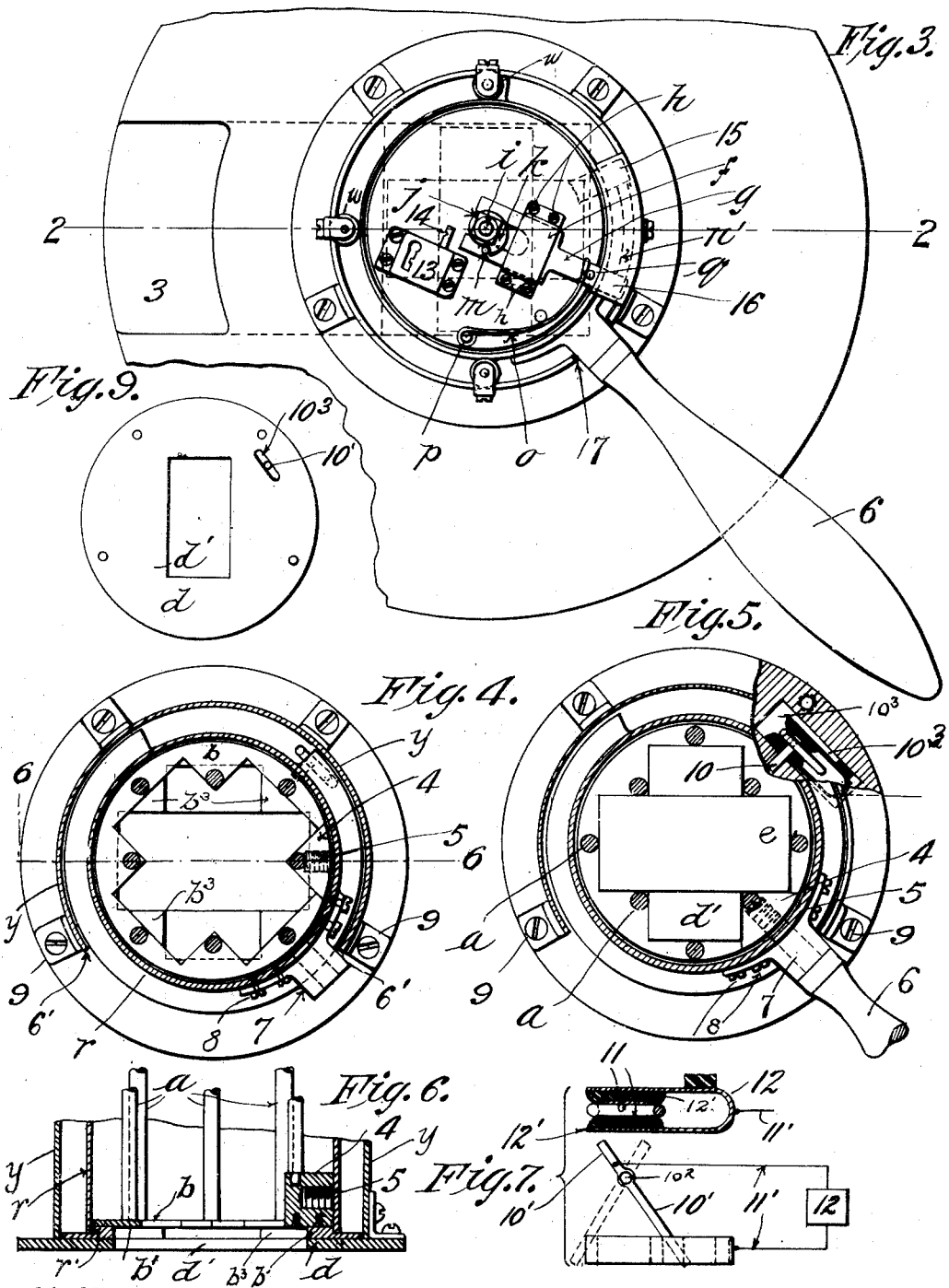

UNITED STATES PATENT OFFICE.

SAMUEL P. THRASHER, OF MANCHESTER, CONNECTICUT.

TICKET DELIVERING AND REGISTERING MECHANISM.

No. 879,217.  Specification of Letters Patent.  Patented Feb. 18, 1908.

Application filed September 17, 1906. Serial No. 334,831. Renewed September 17, 1907. Serial No. 393,327.

*To all whom it may concern:*

Be it known that I, SAMUEL P. THRASHER, a citizen of the United States of America, residing at Manchester, in the county of Hartford and State of Connecticut, have invented new and useful Improvements in Ticket-Delivering and Registering Mechanism, of which the following is a specification.

This invention relates to improvements in ticket delivering mechanism, and sales registering devices operated therefrom upon the delivery of each ticket.

It has for its object to provide a construction that will deliver one ticket from a pile of tickets upon the operation of a suitable operating handle or lever, and at the same time close an electric circuit through a numbering or registering mechanism; said mechanism being preferably located at the central office or elsewhere so that the manager or other proper person may know how many tickets are being sold at all times, it being understood that there may be several of these machines located in different rooms or at different ticket selling points.

Broadly, the invention consists in mounting a suitable framework or ticket cage, within which the tickets have previously been arranged one above the other at right angles to each other within a cylindrical casing, said casing being adapted for rotation, whereby the tickets may be delivered upon the rotation of the same.

The casing above referred to is located within an outer cylindrical casing that is provided with anti-frictional rollers for the purpose of maintaining the first mentioned casing in true and vertical alinement. The ticket cage is locked to the first mentioned casing by means of a bolt construction when the parts are assembled, so that all danger of the tickets being disturbed by any unauthorized person, is obviated.

In the drawings forming a part of this application,—Figure 1 is a general outside view of the ticket-delivering device. Fig. 2 is a sectional view on the line 2—2, Fig. 3. Fig. 3 is a top plan view of the ticket delivering mechanism showing the bolt construction for locking the ticket cage to its operating casing. Fig. 4 is a sectional plan view upon the line 4—4 of Fig. 2 after the loaded ticket cage is placed within the casing and before the cage and casing are rotated into registering position. The full lines represent the position of the tickets before rotation of the ticket cage, and the dotted lines the position after rotation. Fig. 5 is a sectional view on the same line as Fig. 4 showing the cage and casing rotated to registering position so that the operating handle can be inserted and also showing the contact device for closing the circuit that operates the registering device. Fig. 6 is a detailed view of the lower end of the cage and inclosing casings showing the opening in the bottom of the same through which the tickets are delivered on the line 6—6 of Fig. 4. Fig. 7 is a top view and side elevation respectively of the circuit closing device. Fig. 8 is a detailed view of the locking weight that is located within the ticket cage for holding the tickets closely together and for locking the mechanism against operation after the last ticket has been discharged. Fig. 9 is a detail view of the base-plate with a rectangular opening therein and slightly larger than the tickets through which the same pass as they are delivered from the ticket cage. Fig. 10 is a key for rotating the ticket cage.

Referring to the drawings in detail, $a$ designates the series of parallel rods composing the cage for holding the tickets in alinement; the rods being arranged as shown in Figs. 4 and 5 so as to hold the tickets, which are oblong in shape, in crossed, overlapping positions. The lower ends of the rods are secured to a plate or ring $b$ (which has a cross-shaped opening therein,) and to a plate or disk $c$ at their upper ends. The bottom plate $b$ is arranged over a base-plate $d$ which has an oblong or rectangular opening $d^1$ therein a trifle larger than the tickets $e$, as shown in Fig. 9. The opening in this plate is arranged so as to permit the lowermost ticket to drop through the plate $d$ depending upon the position of the operating handle, as described below. The plate $b^1$, which is located immediately below the plate $b$, has a cross-shaped opening therein, as shown by the dotted lines at $b^2$—$b^2$, Fig. 4. The position of this opening in the plate $b^1$ when the ticket cage is assembled, prevents the tickets from dropping down as the ends of the tickets $v$ engage the intermediate projections $b^3$ of the plate $b^1$, but after the ticket cage and cylinder $r$ are secured together by the handle 6, the ends $v^3$ are in alinement with the opening in the plate $b$.

The plate or ring $b^1$ is rigidly secured to the casing $r$ at $r^1$ so that the ring $b^1$ turns with the casing $r$ and on the base-plate $d$, as a bearing. When the tickets are placed within the cage, they stand in the crossed position shown in Fig. 2 with the ends of the lowermost ticket overlapping the discharge opening $d^1$ in the base-plate $d$.

Mounted on top of the upper plate or disk $c$ is a locking construction for holding the ticket cage within its casing $r$, and a metal stamping or other suitable material comprising a piece $f$ through which the bolt $g$ passes, the piece $f$ being secured to the upper plate $c$ by means of the screws or bolts $h$. Secured in top of the plates $c$ is a stud or pin $i$. Integral with this pin is a squared portion $j$ for receiving a socket key, (as shown in Fig. 10) for turning the cam $k$ against the pin $m$ that is located on the slide or bolt $g$ for the purpose of withdrawing the bolt or slide $g$ from partial locking engagement with the catch-piece $n$ into the position shown at the dotted line $n^1$, Fig. 3.

$o$ designates a spring secured at one end to a stud $p$ and its free end engaging a pin $q$ on the bolt $g$ for normally holding the bolt within the catch-piece $n$. The operator, by means of the key shown in Fig. 10, can partially withdraw the bolt $g$ from locking engagement with the piece $n$ and thus rotate the ticket cage within the casing $r$ from the position shown in Fig. 4 to that shown in Fig. 5, so that the operating handle can be secured to the ticket cage. The inside of the casing $r$ is provided with a rack $s$ on two of the rods $a$ as shown, for receiving the locking pawls $t$ that are mounted on the upper surface of the follower weight $u$. This weight is arranged on the top of the pile of tickets $v$, as shown clearly in Fig. 2, and is adapted to lock the ticket cage against rotation when the last ticket is discharged, as fully set forth below. The casing $r$ is held in vertical position by means of the rollers $w$ mounted on the upper ends of the spring-arms $x$ which are carried on the upper edge of the outer cylinder $y$ which is bolted or otherwise secured to the base $z$.

The base-plate $d$, referred to above, is provided with a communicating outlet or passageway 3 for receiving the tickets as they are discharged from the ticket cage $a$ in the manner hereinafter described. Secured to the lower portion of the ticket cage is a block 4 with a screw-threaded opening 5 therein. This block is adapted to receive the threaded end of the operating handle 6. 7 designates a casting secured to the casing $r$ by means of the screws 8. The operating handle is passed through the casting 7 and screwed onto the block 4 after the ticket cage has been rotated by the key shown in Fig. 10 to the position shown in Fig. 5. The handle 6, as shown in Figs. 1, 3, and 5, can swing through an arc of 90 degrees, that is between the shoulders $6^1$ on the outer casing $y$ for the purpose of bringing the tickets in register with the rectangular opening $d^1$ in the base-plate $d$.

Secured to the lower end of the cylindrical casing $r$ is a pin 10 which operates a contact lever $10^1$ that stands in a vertical plane and is adapted to wipe across the platinum contact plates 11, mounted on the spring-arms 12, with the piece $12^1$ of insulation inserted between the arms 12 and plates 11. The contact lever $10^1$ is mounted in the opening $10^3$ of the base-plate, as shown in Fig. 9, for closing an electrical circuit $11^1$, through a registering or counting device 12. The contact lever $10^1$ is pivoted to the base at $10^2$. This registering device is the ordinary counter, such as used on machinery for recording the number of revolutions made, and has no special novelty, it being understood that the counter mechanism is operated by an electrical magnet connected to the ordinary pawl and ratchet mechanism. This registering device is located at the main or central office, as noted above, so that the proper person, as the superintendent or manager, can see at any time the result of the sale.

Referring to Fig. 3, 13 designates a lock having the bolt 14 shown extended into the path of the bolt $g$. When the bolt 14 is in the position shown, it is obvious that the bolt $g$ cannot be drawn farther back than the bolt 14 will permit. When the bolt $g$ is retracted by means of the key shown in Fig. 10, the inner ticket casing can be rotated so as to bring the parts 7 and 4 in registering position, as described.

The key shown in Fig. 10 is attached to some part of the machine, as by a chain. The handle 6 can then be screwed into the block 4. In making this adjustment, the bolt $g$ is retracted from the recess shown at 15 far enough to permit the same to travel under the overhanging lip of the casing $n$, and at the end of the adjustment or registering position of the opening in the parts 7 and 4, the bolt $g$ snaps into the recess 16. During this travel of the bolt $g$ from the recess 15 to the recess 16, the ticket cage cannot be removed from the outer casing $r$ by any unauthorized person, and the tickets tampered with, since the bolt $g$ is still beneath the overhanging part of the casing $n$.

In order to remove the ticket casing, the proper person, (as the superintendent or manager) who retains the key for the lock 13, withdraws the bolt 14 so that the use of the key shown in Fig. 10 will permit the bolt $g$ to be drawn back clear of the casing $n$. It is therefore seen that only the proprietor or manager has access to the tickets.

17 designates a vertical passageway in the outer supporting casing $y$. This vertical passageway is for the purpose of receiving the handle 6 when the casing $r$ is dropped down into the casing $y$. The lower edge of the casing $y$ is cut away to receive the casting 7 and the handle 6, as clearly shown in Fig. 1. The extent of this cut away portion is a trifle more than 90 degrees, as shown in Fig. 4.

The operator, after the tickets are in place and the parts assembled as described, moves the handle 6 through 90 degrees bringing the lowermost ticket of the pile in register with the rectangular opening in the base-plate which permits the same to freely pass through the plate d and down into the opening 3, as shown in Fig. 2. The ticket that immediately follows the one that has dropped from the lower end of the pile is so placed, by this rotation of the casing r through 90 degrees, that it cannot pass through the opening in the base-piece since its overlapping ends lie across the opening in the base-plate, as clearly shown at e, Fig. 5. In order to discharge this ticket, the operator simply throws or moves the handle 6 back from its last position through an arc of 90 degrees. This movement permits this ticket to fall and the succeeding ticket, which is at right angles to the one that has just been discharged, stands with its overlapping edges to the discharge opening. Movement of the handle 6 in the reverse direction of 90 degrees, allows this ticket to fall, so that it will be seen that every movement of the handle through an arc of 90 degrees will discharge a ticket and simultaneously close the circuit to the registering device 12. After the last ticket has fallen into the passageway 3, the follower weight u will drop into the opening $d^1$ in the base-plate, and thus effectually prevent the movement of the handle 6, and consequently the operation of the registering device.

What I claim, is:—

1. In a ticket delivering mechanism, a ticket-cage for receiving tickets in vertical alinement and in overlapping positions at right angles to each other, a casing for receiving the ticket cage, means for locking the two together, and means for operating the same in union, as described.

2. In a ticket delivering mechanism, a ticket cage, a casing to receive the same, means for locking the casing and cage together, means for moving the same in unison, a second lock operatively located relative to the first and operable to permit the cage to be separated from the casing, as described.

3. In a ticket delivering mechanism, a receptacle for receiving the tickets in staggered relation, a casing for receiving said receptacle, means for maintaining the casing in a vertical position, said means comprising a cylindrical member carrying spring arms, said arms being provided with rollers at their upper ends, means for locking the receptacle and casing together, means for operating the same for bringing the receptacle so that the tickets can be discharged at each movement of said operating means as described.

4. In a ticket delivering mechanism, a receptacle for receiving the tickets in staggered relation, a casing for receiving said receptacle, means for maintaining the casing in a vertical position, said means comprising a cylindrical member carrying spring arms, said arms being provided with rollers at their upper ends, means for locking the receptacle and casing together, means for operating the same for bringing the receptacle so that the tickets can be discharged at each movement of said operating means, as described, means for locking the receptacle after the last ticket has been discharged.

SAMUEL P. THRASHER.

Witnesses:
K. I. CLEMONS,
WM. H. CHAPIN.